Figure 1:
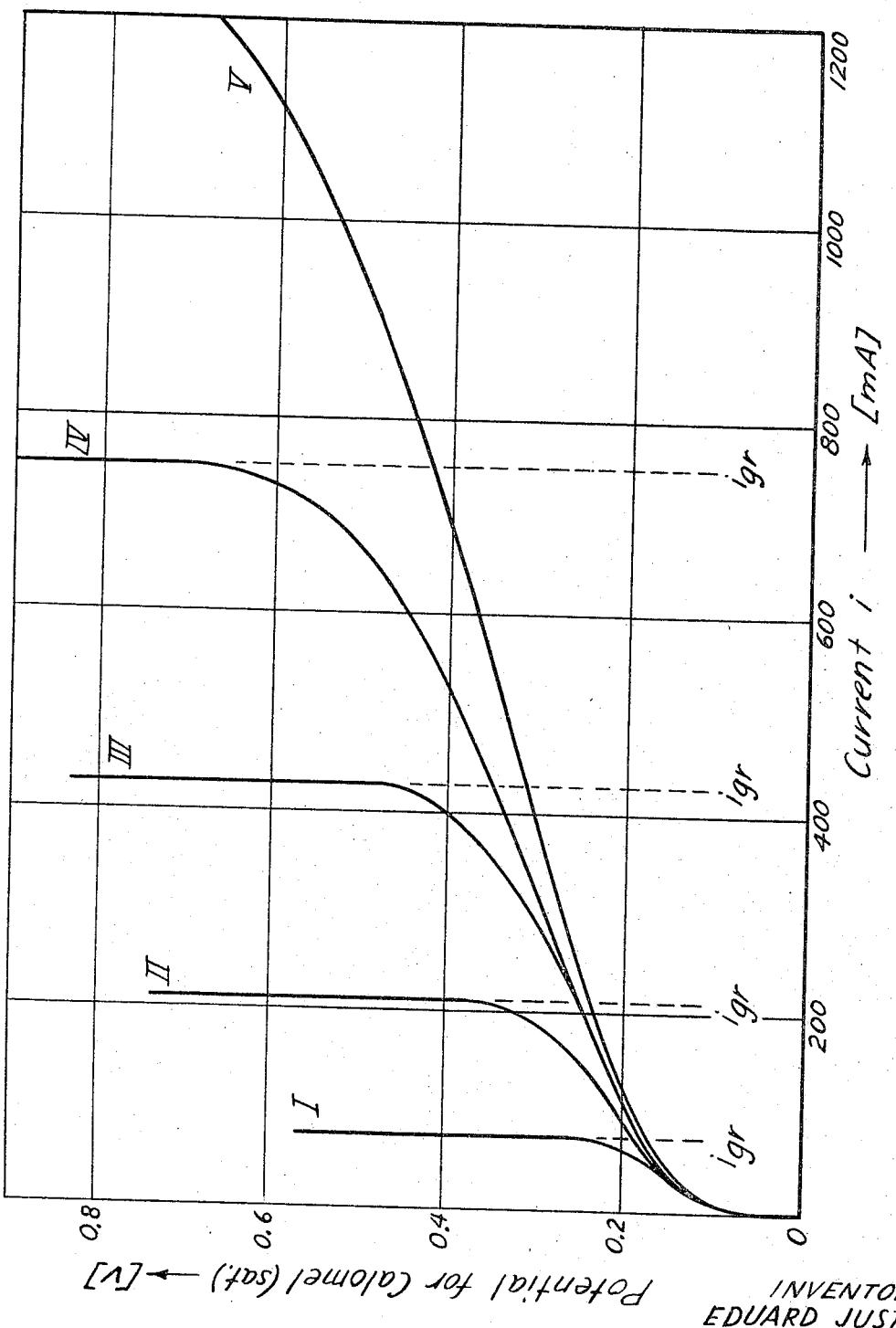

INVENTORS.
EDUARD JUSTI
AUGUST WINSEL

INVENTORS.
EDUARD JUSTI
AUGUST WINSEL

Oct. 17, 1967 — E. JUSTI ETAL — 3,347,759
ELECTROCHEMICAL METHOD AND APPARATUS FOR PRODUCING A
PROTECTIVE GAS MIXTURE CONSISTING
OF NITROGEN AND HYDROGEN
Filed Oct. 7, 1964

INVENTORS.
EDUARD JUSTI
AUGUST WINSEL

United States Patent Office 3,347,759
Patented Oct. 17, 1967

3,347,759
ELECTROCHEMICAL METHOD AND APPARATUS FOR PRODUCING A PROTECTIVE GAS MIXTURE CONSISTING OF NITROGEN AND HYDROGEN
Eduard Justi and August Winsel, Braunschweig, Germany, assignors to Siemens-Schuckertwerke Aktiengesellschaft, Berlin, Germany, and Varta Aktiengesellschaft, Erlangen, Germany, both corporations of Germany
Filed Oct. 7, 1964, Ser. No. 402,258
Claims priority, application Germany, Oct. 9, 1963, S 87,775
16 Claims. (Cl. 204—129)

This invention relates to a process for gaining a protective gas consisting of nitrogen and hydrogen by electrochemical derivation from water and air, and to apparatus for performing said process.

It is known, that by means of gas-diffusion electrodes supplied with mixtures of electrochemically active and electrochemically inactive gases and appropriate selection of the operating parameters, the electrochemically active components can be extracted by reaction of catalytically active material of the electrode, so that only the inactive gaseous component substance escapes from the electrode.

The operating parameters are the electrode current $J$, the electrode potential $\varphi$, the reaction gas content $x$ of the gaseous mixture expressed as percentage, and the gas flow rate $\dot{v}$ in front of or behind the apparatus. They are determined by the equation $f(J, \varphi, \dot{v}, x) = \text{const.}$ Therefore each variable, i.e. each parameter can be expressed as a function of the remaining three, in practise two parameters are usually kept constant.

If, for example, air is supplied to an oxygen cathode, then for a predetermined electrode potential, the electrode current $J$ is only a function of the flow rate $v$ of the gas, because $x = \text{const.}$ and $\varphi = \text{const.}$ If the potential of the oxygen cathode is substantially more negative than the reversible oxygen potential, then the electrode operates in the so-called "saturation region." In this case, if the flow rate $\dot{v}$ is not excessively high, all of the oxygen present in the gas is electrochemically converted in $OH^-$ ions. As a result a more negative potential does not increase the current-density, which in this case is defined as limiting current-density. Specific illustrations of this situation are provided at a later point in this specification.

From the gas chamber of the oxygen cathode operating at limiting current density the "purified" inert gas is then withdrawn. Such a cell represents a highly effective device for gaining purified nitrogen from the air.

If it is desired to utilize the nitrogen thus obtained as a protective gas, then it is suitable to add to it a certain portion of hydrogen which, for practical applications, commonly varies between about 10% and about 30%.

To this end the hydrogen evolved in an electrolysis cell is mixed to the nitrogen, the desired proportions of the mixture being established by suitable selection of the cell currents in the purification cell for nitrogen and the electrolysis cell. Specifically let $y$ be the hydrogen fraction, and $(1-y)$ the nitrogen fraction of the protective gas, of which $\dot{V}$ moles, i.e. $\dot{V}$ moles per second are required. Since each mole of oxygen which must be removed from the nitrogen of the air requires 4 faradays $(F) = 4 \times 96,500$ coulombs, while each hydrogen mole requires for its production 2F charges, it can be calculated that the generation of $\dot{V}$ moles of the protective gas requires a total current $J$ given by Equation 1:

$$J = (1+y)F\dot{V} \tag{1}$$

This current $J$ consists of the additive combination of the current $J_{H_2}$ through the electrolysis cell and the current $J_{N_2}$ through the purification cell, which are given by Equations 2 and 3:

$$J_{H_2} = \frac{2y}{1+y} J \tag{2}$$

$$J_{N_2} = \frac{1-y}{1+y} J \tag{3}$$

Figure 3:
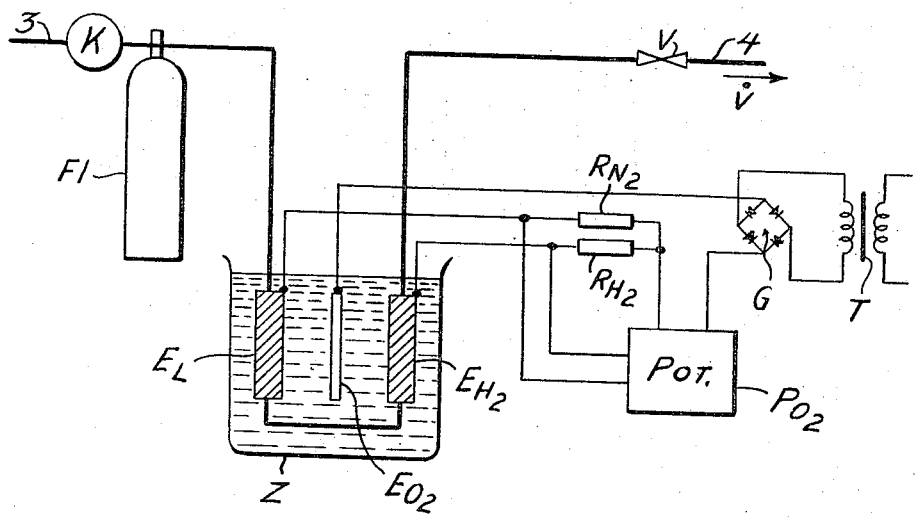
Figure 4:
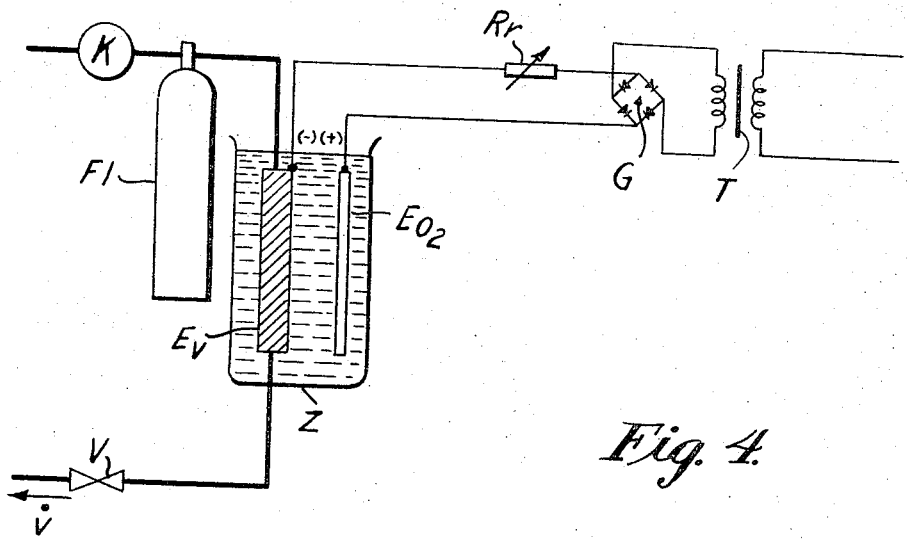

For further details reference is made to the description which follows and to the accompanying drawings wherein:
FIGURE 1 shows certain characteristic relationships pertinent to the practice of the invention,
FIGURE 2 diagrammatically illustrates an apparatus in accordance with the invention,
FIGURE 3 diagrammatically illustrates an alternative form of such an apparatus, and
FIGURE 4 diagrammatically illustrates still another alternative form of such an apparatus.

FIG. 1 shows the current as a function of the potential, demonstrating the previously mentioned phenomenon of limiting current density and the relationship of the limiting current density $i_{gr}$ and the flow rate $v$ of the supplied gas. The illustration applies to a double skeleton catalyst electrode as disclosed in U.S. Patent No. 2,928,-891, operating in 6 N potassium hydroxide solution with air at room temperature. Curves I to V were taken at the flow rates listed below:

(I) $V = 16$ mm.³ sec.⁻¹
(II) $v = 44$ mm.³ sec.⁻¹
(III) $v = 90$ mm.³ sec.⁻¹
(IV) $v = 155$ mm.³ sec.⁻¹
(V) $v = 300$ mm.³ sec.⁻¹

Figure 2:
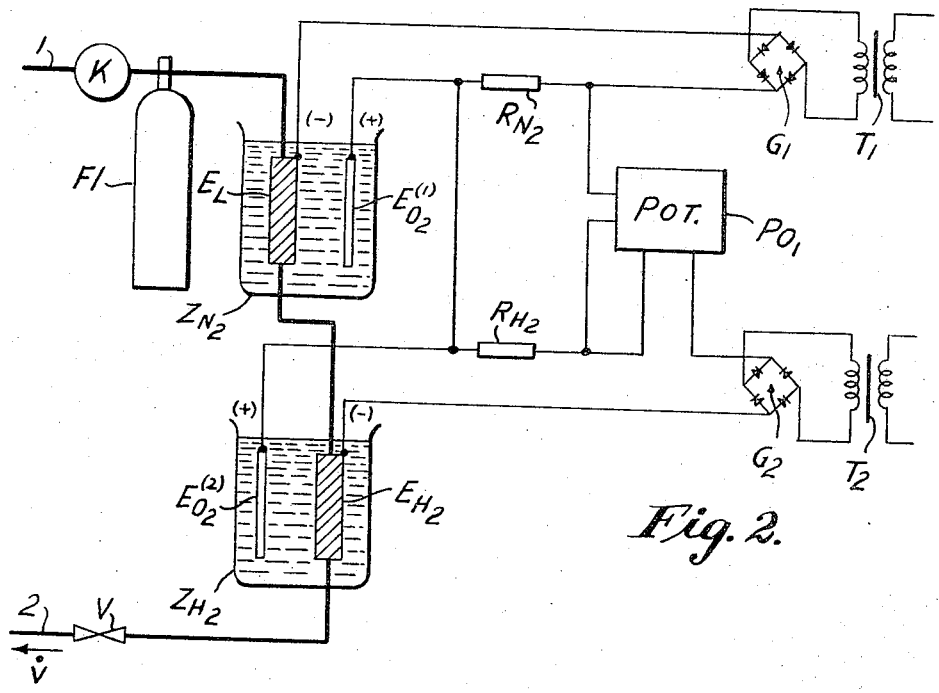

FIG. 2 illustrates an apparatus according to the invention which simultaneously controls the current of the purification cell and the current of the electrolysis cell. Compressor K compresses the air which is drawn in at 1, thereby the pressure in storage bottle Fl is maintained constant. Valve V is so adjusted that the protective gas escapes at 2 at the desired rate of flow. Passing the diffusion cathode $E_L$ of cell $Z_{N_2}$ the atmospheric oxygen is converted in $OH^-$ ions and electrochemically liberated at anode $E^1_{O_2}$. The limiting current $J_{N_2}$ required for highly pure nitrogen results in a potential difference at resistor $R_{N_2}$ proportional to $J_{N_2}$. $G_1$ is a rectifier, $T_1$ a transformer for supplying current to this cell. The nitrogen from cathode $E_L$ is supplied to diffusion cathode $E_{H_2}$ of electrolysis cell $Z_{H_2}$ and there mixed with the cathodically evolved hydrogen. The volume of hydrogen evolved per second is proportional to the current $J_{H_2}$ between oxygen anode $E^2_{O_2}$ and cathode $E_{H_2}$. This current results in a potential difference at resistor $R_{H_2}$.

The potential differences at $R_{H_2}$ and $R_{N_2}$ are compared by an electronic device $PO_1$, which operates as a rheostat for electrolysis cell $Z_{H_2}$ and may be adjusted in such a manner, that the two potential differences become equal. Then the ratio of current $J_{N_2}$ and $J_{H_2}$ is given by Equation 4:

$$\frac{J_{H_2}}{J_{N_2}} = \text{const.} \frac{R_{N_2}}{R_{H_2}} \tag{4}$$

In this way a constant composition of the protective gas is obtained. $G_2$ in FIG. 2 is a rectifier and $T_2$ a transformer.

Since the current $J_{N_2}$ of cell $Z_{N_2}$ as limiting current is not depending on the voltage, both cells can be supplied from a common voltage source and in fact all of the electrodes can be put in the same cell.

FIG. 3, shows such an alternative embodiment of the invention. $E_{O_2}$ is the anode, placed between the two cathodes $E_L$ and $E_{H_2}$. The currents $J_{N_2}$ and $J_{H_2}$ are supplied via resistors $R_{N_2}$ and $R_{H_2}$ respectively, and the potential differences are compared by electronic device $PO_2$, which controls the potential difference at $R_{H_2}$ in such a manner that the ratio of the currents assumes the predetermined value, given by Equation 4. G is the rectifier, T the transformer of the voltage source. Air is pumped by compressor K via 3 into storage bottle $Fl$. Thence the air flows through cathode $E_L$ in which the atmospheric oxygen is converted, then through cathode $E_{H_2}$ where hydrogen is added and finally through valve V which controls the rate of flow. At 4 the protective gas leaves the apparatus.

In the arrangement of both FIGS. 2 and 3 gas diffusion electrodes may be used as cathodes. For that purpose so-called gas valve electrodes are preferably used, they are electrodes consisting of two porous layers of which the fine porous covering layer is exposed to the electrolyte. This layer is made of a material with high overvoltage. The other layer has larger pores and is called "working layer." This type of electrode is described in the pending U.S. patent application Ser. No. 826,812 filed on July 13, 1959. Thus liberation of hydrogen occurs only in the working layer, made of a material with low hydrogen overvoltage. The hydrogen which is evolved is then directly introduced into the nitrogen. This method has the advantage that the protective gas is produced at a pressure higher than atmospheric pressure.

For oxygen cathodes it is possible to use diffusion electrodes of the kind which have been developed during the past decade for fuel cells and other galvanic primary cells. Excellent results have been obtained by using silver as the catalyst material.

As oxygen anode any desired durable electrode body may be used. To prevent unnecessary losses of energy, metals having low oxygen overvoltage, preferably nickel, may be employed. The oxygen anode may also be a porous body and may, for example, be formed as a gas valve electrode when it is desired to make some practical use of the oxygen which is developed in the course of producing the protective gas in accordance with this invention. Frequently, indeed, a simple collecting arrangement suffices for this gas.

In a further embodiment of the invention shown in FIG. 4, the hydrogen and oxygen cathodes are joined to a gas valve electrode $E_V$. In this arrangement, the composition of the protective gas can no longer be maintained constant for varying gas flow rates. Hence this form of arrangement is particularly suitable for continuous operation under uniform demand, in which case a single adjustment of the operating parameters is sufficient. Slow variations in gas composition which take place over a period of time can be corrected by appropriate adjustment of the cell potential and with it of the cell current. This may be done, for example, by control rheostat $Rr$ shown in FIG. 4.

The power consumption L of the process in accordance with the invention is expressed by Equation 5 below:

$$L = J_{H_2}E_{H_2} + J_{N_2}E_{N_2} = [2yE_{H_2} + (1-y)E_{N_2}]F\dot{V} \quad (5)$$

In this expression $E_{H_2}$ is the voltage of the electrolysis cell, $E_{N_2}$ that of the purification cell. As a practical example, assume the supply of a welding installation with 6 liters of protective gas per minute, corresponding to a volume $\dot{V} = 0.0045$ mole per second. If the voltage of the electrolysis cell is $E_{H_2} = 1.6$ volts, with which one can also operate the purification cell, then $L = 0.7(1+y)$ kilowatt. The current required for the production of this quantity of protective gas is $J = 430(1+y)$ amps, for which a current density of 0.1 amps/sq. cm. and a cathode surface of $4300(1+y)$ sq. cm. are necessary. The cost of producing the protective gas is therefore relatively low, and insignificant in comparison to the labor costs. The generator itself, in the illustrative example, can be made so small that it is possible to mount it, with all its accessories, on a small teacart.

If necessary, the protective gas can be dried in known manner in a subsequent processing step.

A particular advantage of the arrangement of FIGS. 2 and 3 should also be noted. This is that the nitrogen from the air is conducted from the gas chamber of the oxygen cathode into the hydrogen cathode. As a result, any remaining traces of oxygen are removed by electrochemical or catalytic union with hydrogen.

It will be understood that the process and apparatus described and illustrated herein is subject to modification in ways obvious to those skilled in the art, without departing from the inventive concept. In the specification the term "protective gas" is a gas which is well suited for forming a protective atmosphere in processes involving the sintering of oxidizable substances.

The following examples illustrate the invention.

*Example 1*

A purification cell was set up in which there was used as oxygen cathode a diffusion electrode made of an uniform mixture of 65 percent by weight carbon black powder using 35 percent by weight polyethylene powder as a binder and hydrophobic material. This mixture was compressed under a pressure of 400 kg. per sq. cm. at 180° C. The plate which was 3 mm. thick and 40 mm. in diameter was positioned in a known manner in a steel support. With a small compressor the air was fed into the gas chamber of this electrode thereby creating a slight excess pressure. The electrode was immersed in a 6 N potassium hydroxide solution as electrolyte. Opposite this cathode there was placed a nickel sheet anode where the oxygen was liberated, while a potential difference of 1 volt was between the two electrodes. The current intensity, dependent upon the air flow rate, was about 1 ampere.

This apparatus consisted of a closed cell which was divided by a fine-meshed nickel grid (mesh-size $15\mu$) into a cathode- and anode compartment. The cell was filled up to a certain height with electrolyte-solution, whereby in each compartment remained one gas chamber. No gas exchange could take place between the two gas chambers, for the frame of the grid was firmly connected with the cell and emerged from the surface of the electrolyte. The purified nitrogen was supplied by a feeding line to the gas chamber of the cathode and was removed by another line. In a similar way the developed oxygen was released from the gas chamber of the anode. With an electrolysis current of 0.5 ampere there was obtained a gas mixture of about 20% hydrogen. This gas mixture was well suited as protective gas for use in the sintering of oxidizable substances.

*Example 2*

To reduce the energy consumption, the production of protective gas was carried out in the following two-cell arrangement.

The cathode of the purification cell was a five-layer double skeleton catalyst electrode, as described in the pending U.S. application Ser. No. 208,153. It consisted of two covering layers between which two working layers were arranged, separated by a so-called gas conducting layer. The material for each covering layer was a powder consisting of an intimate mixture of 2.4 grams of carbonyl nickel powder and 1.6 grams of a powdered (particle diameter of 7.5 to $9\mu$) Raney-alloy consisting of equal parts by weight of aluminium and nickel.

The mixture of each working layer consisted of 3 grams carbonyl nickel powder and 2 grams of a finely powdered Raney-alloy (particle size 35 to $50\mu$) produced from equal parts by weight of nickel and aluminium.

The material for the gas distribution consisted of an intimate mixture of 9 grams of carbonyl nickel powder with 4 grams of potassium chloride crystals of a particle size of 200 to $400\mu$.

The purification cell had two anodes which were arranged on both sides of the above described cathode (U.S. Patent No. 3,150,011). The electrodes were produced by hot-pressing of 3 grams of a double skeleton catalyst mixture at 400° C. onto a nickel sheet under a pressure of 40 tons. The double skeleton catalyst mixture contained 1.6 parts by weight of carbonyl-nickel powder and 1 part by weight of Raney-alloy of aluminium and nickel in the ratio of 1:1 by weight and of 75μ grain size. These electrodes were also activated in hot potassium hydroxide.

The distance between the anodes and the cathode was only 3 mm., the electrolysis potential was 0.8 v. and the current was about 2 amps, the electrolyte was 6 N potassium hydroxide and the ambient temperature 250° C. Under these conditions and at a flow rate of 600 mm.$^3$ sec.$^{-1}$ for the enriched nitrogen, the oxygen content was only about 2%.

The nitrogen so produced was then supplied to the hydrogen gas valve electrode of the electrolysis cell. This electrode, like the diffusion electrode of the previously described enrichment cell, consisted of 5 layers. However the covering layers consisted of copper powder and the working layers contained in the place of Raney-silver-alloy, a Raney-nickel-alloy of composition aluminium: nickel in the proportions of 1:1 by weight. The compression pressure at a compression temperature of 350° C. had a value of 0.8 ton/cm.$^2$. This electrode was also provided with a border of polymeric acrylic acid ester resin and with gas conduits for in- and out-flow, respectively. As anodes there were used two double skeleton catalyst economy electrodes, as previously described.

The electrolyte was a 6 N aqueous potassium hydroxide solution. The distance of the cathode and the anodes was 3 mm. At 25° C. and a current of 1 amp the cell potential was 1.6 v. Under these conditions the gas emerging from the cathode gas chamber at 1 atmosphere overpressure was oxygen-free and contained about 20% hydrogen and 80% nitrogen. The cathode of the purification cell was operated at limiting current density.

*Example 3*

In a further experiment only one diffusion electrode was taken as diffusion cathode of the purification cell and valve electrode of the electrolysis cell and therefore only one cell was needed. At a flow rate of 300 mm.$^3$/sec. the air was at an overpressure of 1 atmosphere gauge, the electrolysis potential was 1.8 v. and the current about 1.5 amps. The gas flowing through the electrode contained, at the outlet of the valve electrode, about 20% hydrogen and 80% nitrogen. The temperature of the electrolyte (6 N potassium hydroxide) was 25° C.

In additional examples, the Raney-nickel catalyst was replaced by platinum or palladium as catalyst. The results were approximately as good as in the examples described in detail above. Some decrease with respect to electrochemical properties was observed for other metals, such as iron or alkali-resistant steel, although many combinations of metals yield operative cells. In one experiment there was also used, in place of the 5-layer valve electrode of the electrolysis cell, a 0.1 mm., thick foil of palladium-silver-alloy, whose one side was exposed to the electrolyte and the other side exposed to the gas was covered with a layer of palladium black as catalyst. In that case the separated hydrogen, after diffusion through the foil, was introduced into the nitrogen passing through the electrode.

We claim:

1. The method of producing a protective gas mixture consisting of nitrogen and hydrogen electrochemically derived from air and water, respectively, said method comprising the steps of causing atmospheric air to flow through a gas diffusion cathode which cooperates with an oxygen liberating anode of an electrochemical cell said cathode causing oxygen in said air to form OH-ions and recovering a gas consisting essentially of nitrogen as effluent from said cathode, cathodically evolving hydrogen from water in a hydrogen cathode, feeding said nitrogen gas effluent into said hydrogen cathode and there mixing it with the cathodically evolved hydrogen, and recovering said mixture of nitrogen gas and hydrogen as effluent from said hydrogen cathode.

2. The process according to claim 1 in which said mixture of nitrogen gas and hydrogen is produced in a proportion high in nitrogen essentially established by the step of proportioning electric current going to said gas diffusion cathode in a predetermined ratio to an electric current going to said hydrogen cathode.

3. The process of claim 2 characterized in that the gas diffusion cathode of said electrochemical cell is operated in a limiting current density region for oxygen at which increasing the negative potential of the electrode does not increase the current density and substantially all of the oxygen present in the air is electrochemically converted to OH-ions.

4. The process of claim 3 characterized in that said current through said hydrogen cathode is controlled by the current through said gas diffusion cathode for forming OH-ions operating in the limiting current density region at which increasing the negative potential of the electrode does not increase the current density and substantially all of the oxygen present in the air is electrochemically converted to OH-ions.

5. The process of claim 4 characterized in that said cathodes are gas valve electrodes.

6. The method of claim 1 characterized in that said gas diffusion cathode is loaded with a limiting current density at which increasing the negative potential of the cathode does not increase the current density and substantially all of the oxygen present in the air is electrochemically converted to OH-ions.

7. The process of claim 1 characterized in that said hydrogen cathode is a gas diffusion cathode and that both cathodes cooperate with a common oxygen liberating anode.

8. The process of claim 7 characterized in that said gas diffusion cathode contains silver and said oxygen liberating anode contains nickel.

9. An apparatus for the production of a protective gas mixture consisting of nitrogen and hydrogen electrochemically derived from air and water, respectively, comprising in a cell a gas diffusion cathode for electrochemically reacting the oxygen of the air and obtaining a gas consisting essentially of nitrogen, a hydrogen cathode for reacting water and obtaining hydrogen gas, a common anode, means for passing air into said gas diffusion cathode, means for passing said gas from said gas diffusion cathode into said hydrogen cathode, and means for removing a mixture of said nitrogen gas and hydrogen from said hydrogen cathode as the effluent therefrom.

10. The apparatus of claim 9 further comprising means for supplying electric currents to said cathodes and anode, and means for automatically controlling said currents to maintain a predetermined proportion high in nitrogen between said hydrogen and said nitrogen gases.

11. Apparatus for producing a protective gas mixture consisting of nitrogen and hydrogen electrochemically derived from air and water, respectively, said apparatus comprising means for compressing said air, gas diffusion cathode means for electrochemically removing from said compressed air the oxygen present therein, thereby producing as effluent from said cathode a gas consisting essentially of nitrogen, hydrogen cathode means for cathodically evolving hydrogen, at least one oxygen liberating anode means cooperating with said cathodes, means for conducting said nitrogen gas from said gas diffusion cathode means into said hydrogen cathode means, said nitrogen forming a mixture with the hydrogen in said latter means, and means for recovering the mixture of gases from said hydrogen cathode means.

12. The apparatus according to claim 11 wherein said hydrogen cathode means is a gas valve electrode.

13. The apparatus of claim 11 characterized in that said means for removing said oxygen comprises an electrochemical purification cell containing as the only electrodes therein said gas diffusion cathode and an oxygen liberating anode means.

14. The apparatus of claim 11 characterized in that said means for evolving hydrogen comprises an electrolysis cell containing as the only electrodes therein said hydrogen cathode and an oxygen liberating anode means.

15. The apparatus of claim 11 further comprising means for supplying electric currents to said cells, and means for automatically controlling said currents to maintain a predetermined proportion high in nitrogen between said hydrogen and said nitrogen in said mixture of gases.

16. Apparatus for the production of a protective gas composition composed of electrolytically recovered hydrogen in admixture with electrolytically recovered nitrogen comprising an electrolysis cell having a gas diffusion cathode in combination with an oxygen liberating anode for recovery of a gas consisting essentially of nitrogen from air, an electrolysis cell having a hydrogen cathode and an oxygen liberating anode for recovery of hydrogen from an aqueous electrolyte, means for conducting said nitrogen into said hydrogen cathode, means for removing protective gas as an effluent from said hydrogen cathode, and means for proportioning continuously current $J_{N_2}$ going to said gas diffusion cathode in a predetermined ratio to current $J_{H_2}$ going to said hydrogen cathode, said proportioning means comprising resistor means $R_{N_2}$ providing resistance to the flow of current $J_{N_2}$ and resistor means $R_{H_2}$ providing resistance to the flow of current $J_{H_2}$ in combination with adjustable means for equalizing the potential differences at $R_{N_2}$ and $R_{H_2}$, in which J=current, R=resistor, N=nitrogen and H=hydrogen.

References Cited

UNITED STATES PATENTS

| | | | |
|---|---|---|---|
| 1,340,826 | 5/1920 | Greenwalt | 204—270 |
| 1,446,736 | 2/1923 | Clark | 204—129 |
| 2,435,973 | 2/1948 | MacTaggart et al. | 204—228 |
| 2,925,455 | 2/1960 | Eidensohn et al. | 136—86 |
| 2,928,891 | 3/1960 | Justi et al. | |
| 3,124,487 | 3/1964 | Duddy et al. | 136—86 X |
| 3,175,150 | 3/1965 | Druylants | 204—267 |

FOREIGN PATENTS 303,027   10/1929   Great Britain.

JOHN H. MACK, *Primary Examiner.*

H. M. FLOURNOY, *Assistant Examiner.*